(12) United States Patent
Horvitz et al.

(10) Patent No.: US 9,015,081 B2
(45) Date of Patent: Apr. 21, 2015

(54) PREDICTING ESCALATION EVENTS DURING INFORMATION SEARCHING AND BROWSING

(75) Inventors: Eric J. Horvitz, Kirkland, WA (US); Ryen W. White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 891 days.

(21) Appl. No.: 12/826,962

(22) Filed: Jun. 30, 2010

(65) Prior Publication Data
US 2012/0005132 A1    Jan. 5, 2012

(51) Int. Cl.
*G06F 15/18*      (2006.01)
*G06F 17/30*      (2006.01)

(52) U.S. Cl.
CPC .... *G06F 17/30867* (2013.01); *G06F 17/30899* (2013.01)

(58) Field of Classification Search
CPC ... G06N 5/02; G06F 17/30707; G06K 9/6267
See application file for complete search history.

(56) References Cited

U.S. PATENT DOCUMENTS

| 6,161,130 A * | 12/2000 | Horvitz et al. ................. 709/206 |
| 7,454,393 B2 | 11/2008 | Horvitz et al. |
| 2006/0106784 A1* | 5/2006 | Alpha ............................... 707/3 |
| 2007/0016443 A1 | 1/2007 | Wachman et al. |
| 2007/0067293 A1 | 3/2007 | Yu |
| 2009/0089082 A1 | 4/2009 | Heckerman et al. |
| 2010/0070554 A1 | 3/2010 | Richardson et al. |

OTHER PUBLICATIONS

Thorsten Joachims, "Optimizing Search Engines using Clickthrough Data", 2002, SIGKDD, pp. 1-10.*
White et al., "Cyberchondria: Studies of the Escalation of Medical Concerns in Web Search", Microsfot (website: http://research.microsoft.com/apps/pubs/default.aspx?id=76529), Nov. 2008, pp. 1-36.*
White, et al., "How Medical Expertise Influences Web Search Interaction", Retrieved at << http://people.csail.mit.edu/teevan/work/publications/posters/sigir08.pdf >>, Annual ACM Conference on Research and Development in Information Retrieval, Proceedings of the 31st annual international ACM SIGIR conference on Research and development in information retrieval, Jul. 20-24, 2008, pp. 2.
White, et al., "Cyberchondria: Studies of the Escalation of Medical Concerns in Web Search", Retrieved at << http://research.microsoft.com/pubs/76529/TR-2008-178.pdf >>, ACM Transactions on Information Systems (TOIS), vol. 27, No. 4, Nov. 2009, pp. 36.

(Continued)

*Primary Examiner* — Jeffrey A Gaffin
*Assistant Examiner* — Paulinho E Smith
(74) *Attorney, Agent, or Firm* — Dan Choi; Judy Yee; Micky Minhas (57) ABSTRACT

Escalations in users' goals or concerns in web-based searching and browsing may be predicted. An escalation feature is extracted from a webpage and run through a classifier trained to estimate a likelihood that a subsequent search query will comprise an escalation when compared to a previous search query and/or that a subsequent webpage selection will comprise an escalation when compared to a previous webpage selection. It can thus be predicted whether a user visiting a current webpage is likely to escalate or navigate to another webpage based upon the current webpage, for example.

20 Claims, 8 Drawing Sheets

(56) References Cited

OTHER PUBLICATIONS

Jacquemart, et al., "Towards a Medical Question-Answering System: a Feasibility Study", Retrieved at << http://www.ncbi.nlm.nih.gov/pmc/articles/PMC1839371 >>, Proceedings Medical Informatics Europe, vol. 95 of Studies in Health Technology and Informatics, 2003, pp. 6.

Eysenbach, et al., "Towards Quality Management of Medical Information on the Internet: Evaluation, Labelling, and Filtering of Information", Retrieved at << http://www.bmj.com/cgi/content/full/317/7171/1496/ >>, 1998, pp. 11.

Beitzel, et al., "Hourly Analysis of a Very Large Topically Categorized Web Query Log", Retrieved at << http://ir.iit.edu/publications/downloads/p249-beitzel.pdf >>, Annual ACM Conference on Research and Development in Information Retrieval, Proceedings of the 27th annual international ACM SIGIR conference on Research and development in information retrieval, Jul. 25-29, 2004, pp. 8.

Deshpande, et al., "Selective Markov Models for Predicting Web-Page Accesses", Retrieved at << http://www.siam.org/meetings/sdm01/pdf/sdm01_04.pdf >>, ACM Transactions on Internet Technology (TOIT), vol. 4, No. 2, May 2004, pp. 1-15.

Haveliwala, Taher H., "Topic Sensitive Page Rank", Retrieved at << http://www-cs-students.stanford.edu/~taherh/papers/topic-sensitive-pagerank.pdf >>, International World Wide Web Conference, Proceedings of the 11th international conference on World Wide Web, May 7-11, 2002, pp. 10.

Lau, et al., "Patterns of Search: Analyzing and Modeling Web Query Refinement", Retrieved at << ftp://ftp.research.microsoft.com/pub/ejh/queryrefine.pdf >>, Proceedings of the seventh international conference on User modeling, 1999, pp. 10.

Lempel, et al., "Predictive Caching and Prefetching of Query Results in Search Engines", Retrieved at << http://www.cs.technion.ac.il/~moran/r/PS/www12.pdf >>, International World Wide Web Conference, Proceedings of the 12th international conference on World Wide Web, May 20-24, 2003, pp. 10.

"Open Directory", Retrieved at << Project http://www.dmoz.org >>, Retrieved Date: Mar. 29, 2010, pp. 1.

Ravindran, et al., "Exploiting Hierarchical Relationships in Conceptual Search", Retrieved at << http://citeseer.uark.edu/publications/CIKM04-conceptual.pdf >>, Conference on Information and Knowledge Management, Proceedings of the thirteenth ACM international conference on Information and knowledge management, Nov. 8-13, 2004, pp. 8.

Shen, et al., "Investigations of topic dynamics in Web search", Retrieved at << http://research.microsoft.com/pubs/70143/tr-2005-20.doc >>, Technical Report, TR-2005-20, 2005, pp. 1-8.

Spink, et al., "Searching the Web: The Public and Their Queries", Retrieved at << http://comminfo.rutgers.edu/~tefko/JASIST2001.pdf >>, Journal of the American Society for Information Science and Technology, vol. 52, No. 3, Feb. 1, 2001, pp. 226-234.

Sugiyama, et al., "Adaptive Web Search Based on User Profile Constructed without Any Effort from Users", Retrieved at << http://www.iw3c2.org/WWW2004/docs/1p675.pdf >>, International World Wide Web Conference, Proceedings of the 13th international conference on World Wide Web, May 17-22, 2004, pp. 675-684.

Shen, et al., "Analysis of Topic Dynamics in Web Search", Retrieved at << http://research.microsoft.com/en-us/um/people/horvitz/topicx_www_2005.pdf >>, International World Wide Web Conference, Special interest tracks and posters of the 14th international conference on World Wide Web, May 10-14, 2005, pp. 1102-1103.

* cited by examiner

PREDICTING ESCALATION EVENTS DURING INFORMATION SEARCHING AND BROWSING

BACKGROUND

Web-based searching for information can utilize a search engine to perform queries of content found on the Internet as well as queries of other data sources, such as a distributed database. The search engine typically includes a user interface which enables query terms to be input and results to be returned for the query. Search queries can return millions of results for common terms, and many of the resulting webpages returned can comprise information from reliable and unreliable sources. There are very few restrictions on what is available on the Internet.

The World Wide Web can provide a variety of information to users, for example, where websites can provide answers to questions concerning symptoms, items, locations, and more. As an example, information obtained from healthcare-related searches can affect peoples' decisions about when to engage a physician for assistance with diagnosis or therapy, how to treat an acute illness or cope with a chronic condition, as well as their overall approach to maintaining their health or the health of someone in their care. Beyond considerations of illness, information drawn from the Web can influence how people reflect and make decisions about their health and wellbeing, including the attention they seek from healthcare professionals, and behaviors with regard to diet, exercise, and preventative, proactive health activities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As an example, in medical-based web search, large volumes of medical information on the Web, some of which is erroneous, may mislead users with health concerns. In this example, the use of Web search as a diagnostic procedure, where queries describing symptoms are input and a rank and information of results are interpreted as diagnostic conclusions, can lead users to believe that common symptoms may be a result of serious illnesses. It will be appreciated, however, that medical related issues are merely one example of where escalations may occur. That is, the disclosure herein can pertain to any specific domain, with medical merely being one example.

Accordingly, one or more techniques and/or systems are disclosed for construction a predictive model from data that can predict a likelihood that a user will escalate from the consideration of common, benign outcomes or query terms, to rarer, more severe outcomes or specifically targeted query terms, which are described as escalation events. Predictions may comprise forecasts of a likelihood that a patient will return to revisit concerns about a diagnosis via online search in two or more sessions, and that the user will access pages on resource providers (e.g., local retailer for treatment goods or services).

In one embodiment for predicting query escalations for web-based searching, one or more escalation features are extracted from a webpage. The one or more escalation features are run through a classifier trained (e.g., by running the classifier over a training set of tagged pages using escalation features) to estimate a likelihood of escalation, such as a probability score that an escalation event will occur if the webpage is visited. An escalation likelihood result is generated from running the trained classifier using the extracted features. The escalation likelihood result can comprise an estimation that a subsequent search query will comprise an escalation when compared to a previous search query. The escalation likelihood result can also comprise an estimation that a subsequent webpage selection will comprise an escalation when compared to a previous webpage selection.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
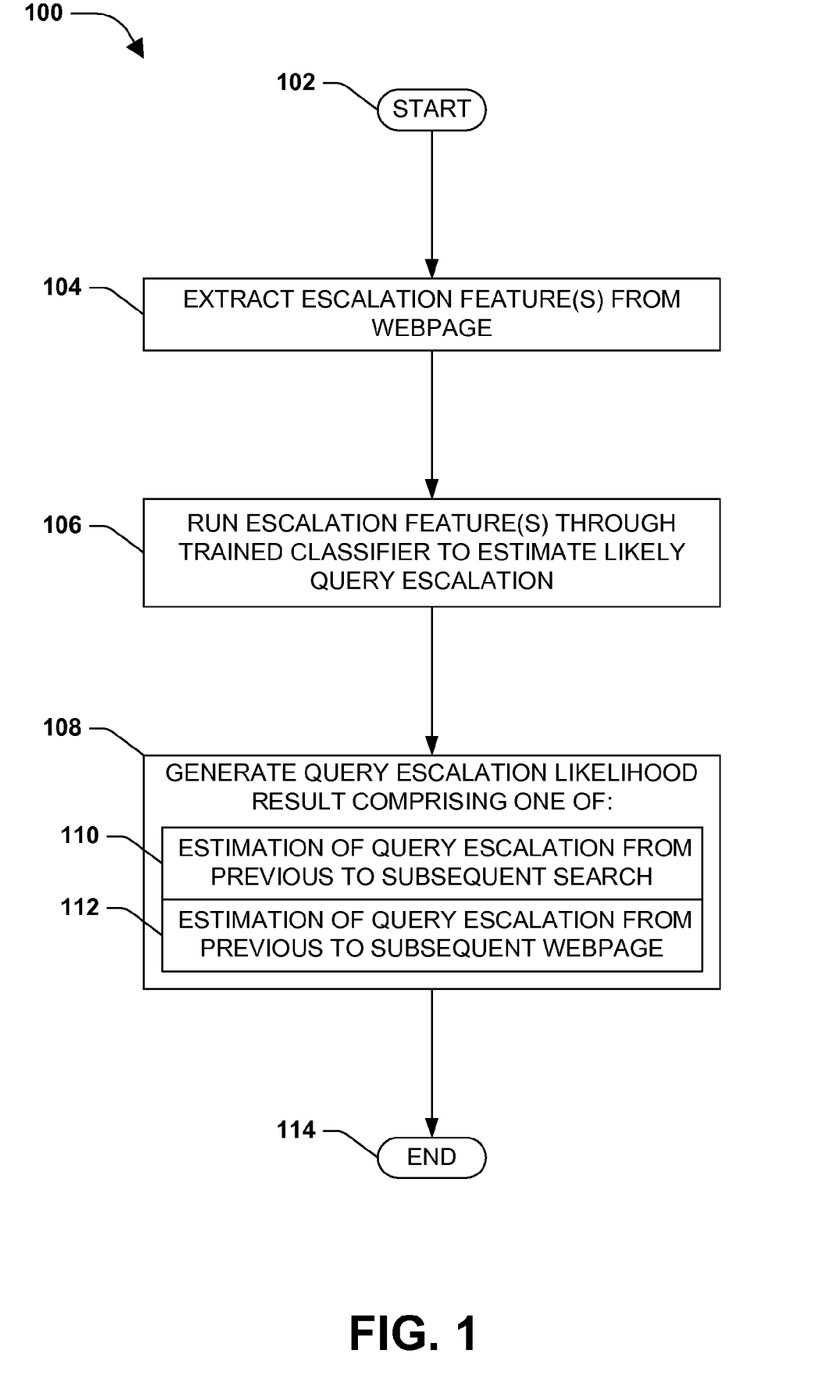
FIG. 1 is a flow diagram of an exemplary method for predicting query escalations for web-based searching.

FIG. 1 is a flow diagram of an exemplary method 100 for predicting query escalations for web-based searching. The exemplary method 100 begins at 102 and involves extracting one or more escalation features from a webpage, at 104. In one embodiment, escalations can be observed increases in severity of concerns represented by the search terms within a single search session, for example. As an example, a search session can be a chronologically ordered set of webpages associated with a query to a web search engine and terminating with an actual end of session or a session inactivity timeout period.

In one embodiment, query escalations can be revealed by queries issued by a user to a search engine, where query terminology is related to a predefined list of escalation terms, and/or associated with modifiers used to express particular user concerns. As an example, in online medical-related searching, websites can provide answers to such questions as whether concerning symptoms might indicate a serious, perhaps chronic or fatal condition, or whether such fears are unfounded. However, queries describing symptoms can be input and a rank of results and associated information can be interpreted as a diagnostic conclusion, which can lead users to believe that common symptoms may be a result of serious illnesses. In this example, escalations from common symptoms to serious concerns can lead to unnecessary anxiety, investment of time, and expensive engagements with healthcare professionals.

In one embodiment, extracting one or more escalation features from a webpage can comprise extracting structural features from a webpage. For example, in a medical-related environment, a structural feature can comprise a webpage having a serious illness preceding benign explanations for symptoms, and could include a number of words or lines between the serious illness and the benign explanation (e.g., more words between serious and benign may lead to a great escalation). Further, the webpage may comprise modifiers such as "unlikely to be" that appear near serious illnesses. These are examples, of page structural features that may be used as escalation features, for example, which may indicate degrees of escalation (or non-escalation).

At 106 in the exemplary method 100, the one or more escalation features are run through a classifier trained to estimate a likelihood of escalation for the webpage. In one embodiment, a classification model can be built using logistic regression over a training set (e.g., comprising known escalation and non-escalation events). The model (trained classifier) can be used to predict a probability of occurrence of an escalation event, such as by fitting extracted feature data from the webpage to a logistic curve created during the training.

At 108, an escalation likelihood result is generated from running the trained classifier using the extracted features. A likelihood result can comprise an estimation that a subsequent search query comprises an escalation when compared to a previous search query, at 110. For example, a user may perform a search query using a first set of terms, resulting in a first set of search results, comprising webpages. In this example, extracted features from a webpage in the first set of search results can be run through the trained classifier to produce an escalation likelihood result. In one embodiment, the likelihood result comprises an estimation (e.g., a percentage probability) that if a user navigates to the webpage, a second set of terms from a subsequent search query will comprise escalation terms.

As an example, escalation terms may be pre-defined, such as in medical-related searches, where the first set of terms comprises benign symptoms (e.g., headache) and the second set of terms comprises serious conditions (e.g., brain tumor). As another example, a user may be searching for symptoms related to automotive conditions, where a first set of terms comprises general conditions (e.g., clicking noise in engine) and the second set of terms comprise severe conditions (e.g., broken piston rod). Additionally, as another example, the first set of terms may comprise features of an item or area of interest (e.g., features of a tent, person limit, size, weight; or conditions for joining a fraternal organization) and the second set of terms may comprise escalation terms for identifying where to buy the item or how to get involved in an area of interest (e.g., manufacturers or retailers of tents; or contacts/locations of the fraternal organization). Thus, predicting escalation can also lead to advertising opportunities. Moreover, medical, automotive and items or areas of interest are merely a few examples of possible domains and the disclosure herein and the appended claims are not intended to be limited by these illustrative examples.

In another embodiment, at 112, a likelihood result can comprise an estimation that a subsequent webpage selection, such as by a user, will comprise an escalation when compared to a previous webpage selection. For example, a first page selected by a user may comprise discussion of possible causes of a headache and a subsequent selection may comprise comprises listings of local neurologists. In this example, an escalation may have occurred because the first page was merely a discussion on causes of headaches, such as stress or caffeine withdrawal, while the second page jumps to looking for a local neurologist, such as for diagnosis (e.g., for a brain tumor). Querying for headache and then visiting cancer.org may also be an example of an escalation.

It will be appreciated that, while particular embodiments of uses for the techniques, described herein, are used to provide illustrative examples, the techniques are not limited to any particular embodiment. It is anticipated that those skilled in the art may apply escalation the prediction techniques, described herein, to a plurality of areas. For example, escalation prediction may be used as a type of filter for search queries, where webpages can have a ranking applied that indicates to a user an estimated potential for an escalation occurring if the page is viewed by the user.

Having generated an escalation likelihood result by running the trained classifier using the extracted features, the exemplary method 100 ends at 114.

Figure 2A:
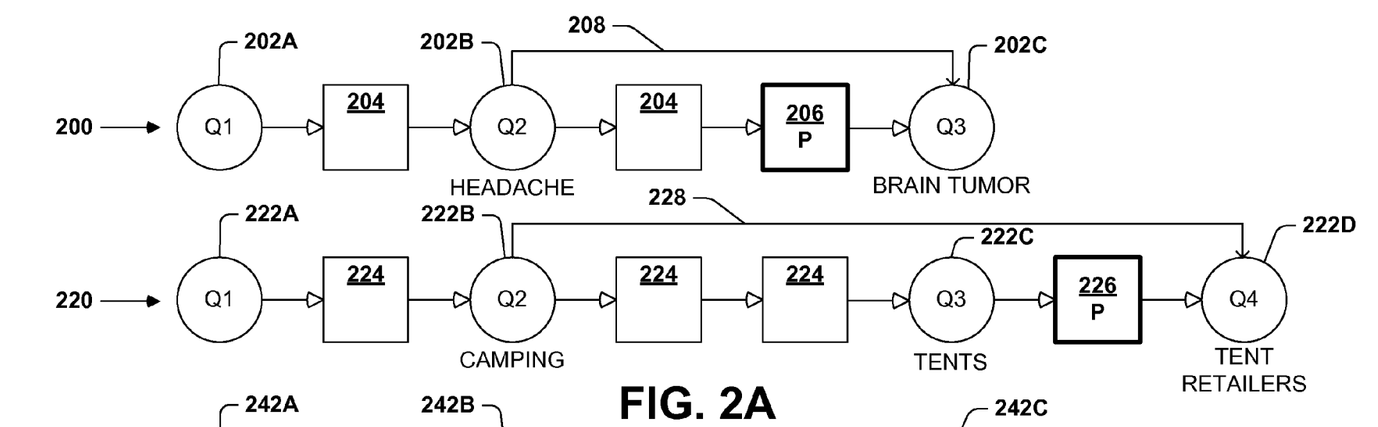
FIGS. 2A and 2B are diagrams that illustrate examples of web-based sessions comprising escalation events and non-escalation events.
Figure 2B:
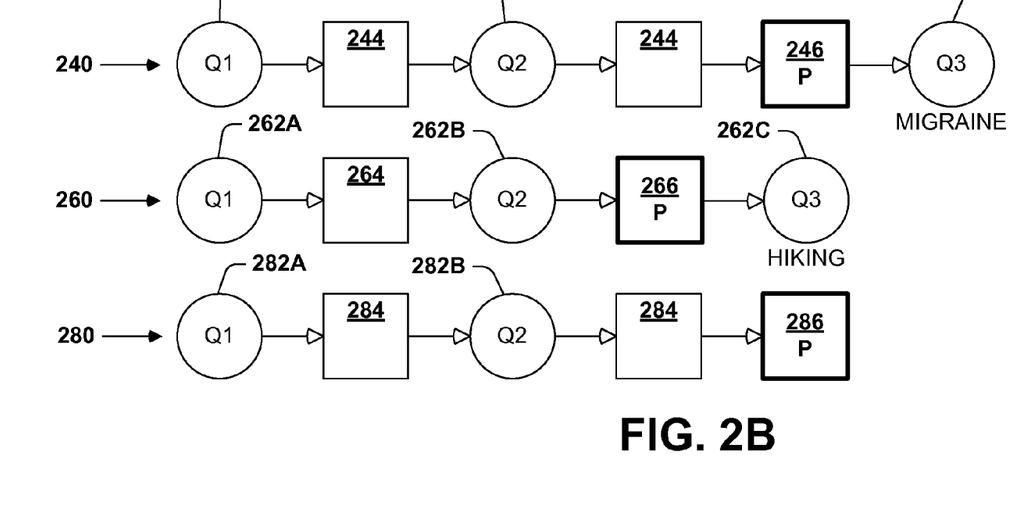

FIGS. 2A and 2B are diagrams that illustrate examples of web-based sessions comprising escalations 200 and 220, and non-escalations 240, 260 and 280. In session 200, a first user query 202A may comprise terms that triggers some medical evaluation terminology, such as a search for medical-based websites. The user may or may not review one or more of the selections (e.g., 204, a non-interesting website) from the search results that does not satisfy their needs, for example. The user may perform a second search query 202B that comprises symptoms, such as "headache." The user selects one 206 of the search results 204, 206 to review. After reviewing the selected page 206, the user generates a thirds query 204 that comprises escalation terms, such as "brain tumor," when compared to the previous query 202B.

In this example, the escalation 208 can be determined between the two searches 202B and 202C, using the query terms. In one embodiment, when the escalation 208 is indicated, the page immediately preceding the escalated query 202C can be examined to identify which features may have caused the user to escalate the query, for example. These features can be used to train a classifier for estimating escalation likelihood. In another embodiment, an escalation likelihood result may be determined for the page 206, such as to provide an indication to the user in the search results, as described above.

As another example of an escalation session 220, a second query 222B (after query 222A and result 224) may comprise a rather general term, such as "camping." The returned results may comprise uninteresting pages 224, which the user may or may not review. A subsequent search 222C provides a more narrow term, such as tents, where a user is provided with a page they select 226. In this example, a subsequent, fourth query 222D comprises terms that indicate the user is looking for a local tent retailer, for example. An escalation 228 is provided when comparing the second query 222B with the fourth query 222D. Again, in this example 220, the page 226 preceding the escalation query 222D can be examined for features that may have lead to the escalation 228.

In the example 240 of FIG. 2B, a first query 242A and second query 242B may be similar to those of example 200 (202A and 202B respectively). However, a third query 242C merely comprises a more specific type of headache, namely a "migraine." In this example, the escalation terms can be pre-defined, where "migraine" is defined as a non-escalation term when compared with "headache." In example 260, a second query 262B may comprise the same terms as 222B of FIG. 2A. However, in this example, a subsequent query, after reviewing a returned page result 266, results in an undefined non-escalation. In the example 280, a non-escalation can occur when the user merely ends a session at a review page 286, without a subsequent query. In one embodiment, the session may merely time out, or the user may close the browser, for example, without a defined escalation or subsequent query.

Figure 3:
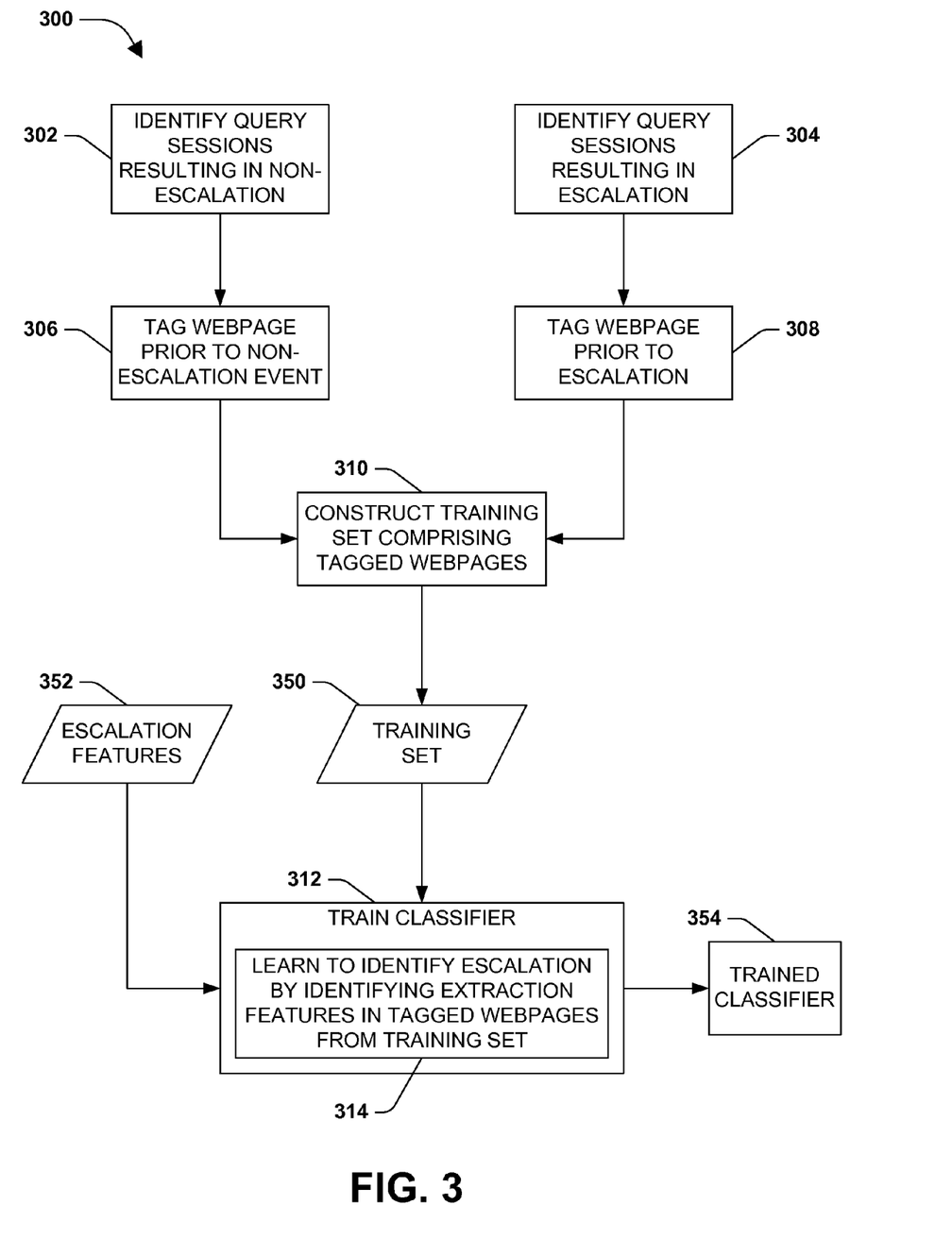
FIG. 3 is a flow diagram illustrating an example embodiment of one or more portions of a method where a classifier can be trained to estimate escalation likelihoods.

FIG. 3 is a flow diagram illustrating an example embodiment 300 of one or more portions of a method where a classifier can be trained to estimate escalation likelihoods. At 302, query sessions that result in non-escalations are identified. As an example, referring to FIG. 2B, examples 240, 260 and 280 respectively result in non-escalations. In these examples, the page previous 246, 266, 286 to a non-escalation event (e.g., timeout, close session, no subsequent query, defined non-escalation, undefined non-escalation) can be examined. Features from these "non-escalating" pages can be extracted, and identified as contributing to a non-escalation event, for example.

At 306, the webpages that are identified as non-escalating pages (prior to a non-escalation event, such as 246, 266 and 286) can be tagged as non-escalating. At 304, query sessions that result in an escalation event can be identified. As an example, referring to FIG. 2A, examples 200 and 220 comprise escalation events 208 and 228. In 200, there was a query escalation between the second query 202B and the third query 202C. In this example, the page 206 preceding the third query 202C is identified as an escalation page, and tagged as such, at 308. Additionally, the page 226 preceding the fourth query 222D of example 220 can be identified as an escalation page, and tagged as such, at 308.

At 310 in the exemplary embodiment 300, a training set 350 is constructed, which comprises the webpages tagged as resulting in subsequent search query escalations, and webpages tagged as resulting in subsequent search query non-escalations. At 312, the classifier is trained over the training set 350 using one or more identified escalation features 352 of a webpage. Training the classifier can comprise teaching the classifier to identify an escalation (e.g., degrees of escalation expressed as a probability) by identifying extraction features 352 in the tagged webpages from the training set 350.

In one embodiment, escalation features can comprise one or more of: structural features, as described above; title and/or URL features, such as where the title comprises a serious illness, or the URL is a forum; first-person testimonials, for example, where the page comprises phrases such as "told me", "I felt", and "I am worried"; page reliability features, for example, where the page is externally verified by healthonnet.org, and/or is recommended by a consulting physician; commercial intent features, such as where the page has advertisements, and how many advertisement blocks; and general page features, such as word lengths and total size (e.g., in kB or mB of data).

The following table comprises some example page features that may be used in a medical-based escalation determination:

| Page Features |
| --- |
| SeriousThenBenign: Serious illness before benign explanation |
| NumGraveConcerns: Number grave concerns (e.g., fatal) |
| NumWordsToSerious: Number words to first serious illness |
| NumWordsToBenign: Number words to first benign explanation |
| NumWordsBetweenSeriousAndBenign: # of words between $1^{st}$ serious illness & $1^{st}$ benign explanation |
| AdsPresent: Advertisements present on page? |
| UrlTrusted: Page from trusted source (e.g., .medlineplus)? |
| TrustedDomain: Page from trusted domain (e.g., .edu)? |
| IsWebForum: Page is a Web forum? |
| SeriousInTitle: Serious illness in title? |
| BenignInTitle: Benign explanation in title? |
| NumNegMod: Number negative mods (e.g., don't have) |
| NumPosMod: Number negative mods (e.g., do have) |
| NumTestimonials: Number testimonials (e.g., I was scared) |
| LengthInWords: Number of words |
| SizeInKB: Size in kilobytes (text only) |
| SeriousInFirstPara: Serious illness in first paragraph? |
| BenignInFirstPara: Benign explanation in first paragraph? |
| SeriousAndBenignInFirstPara: Serious/benign first para? |
| NoSeriousBenignInFirstPara: No serious/benign first para? |
| HasHONCode: Verified by www.healthonnet.org? |
| NumSerious: Number of serious illnesses |
| NumBenign: Number of benign explanations |
| FracDocFirstSerious: Fraction doc. to first serious illness |
| FracDocFirstBenign: Fraction doc. to first benign explanation |
| NumSeriousInFirstPara: Num. serious illness in first para. |
| NumBenignInFirstPara: Num benign explanation in first para |
| HasURAC: Has URAC verification code? |
| HasSeekMedicalAdvice: Recommends medical consult. |
| NumAdBlocks: Number of advertising blocks |
| ForHealthProfessionals: Content meant for health professional |
| HasResources: Mentions external resources (eq., doctor) |

In one embodiment, the escalation features can comprise escalation features from a user session, such as from the current user, and/or one or more other users. For example, user session features can comprise one or more of: a number of queries in a session; query structural features; escalating result features; number of non-query webpages; and user session time features. The following table comprises some example user session features that may be used in a medical-based escalation determination:

| Session Features |
| --- |
| NumQueries: Number of queries between |
| AvgQueryLength: Average query length (in tokens) |
| NumURLs: Number of pages between |
| NumEscalationQueries: Num queries with escalations |
| AvgDwellTime: Average dwell time of between pages |
| NumNonEscalationQueries: Num queries with benign exp. |
| TotalDwellTime: Total dwell time of between pages |

In one embodiment, the escalation features can comprise one or more escalation features from a user session history, where a user session history may comprise a combination of user sessions from a same or different users (e.g., indicative of behavior and/or sources extending beyond a particular session(s)). For example, user session features can comprise one or more of: features of a number of content queries per a time vector; features of a prior session query; and features of prior session resources history (e.g., medical history, levels of engagement with healthcare professionals, location information, demographics, etc.). The following table comprises some example user session history features that may be used in a medical-based escalation determination:

| User Features |
| --- |
| AvgSymptomSearchesPerDay: Num symptoms per day |
| AvgMedicalSessionsPerDay: Num med sessions per day |
| NumUniqueSymptoms: Number unique symptoms |
| NumPrevEscalations: Number previous escalatory queries |
| NumResourceQueries: Number previous resource queries |

Returning to FIG. 3, in one embodiment, a result of the training of the classifier can be a trained classifier 354, which is able to estimate escalation likelihood. For example, the classifier may comprise a logistic regression model (e.g., an algorithm disposed in memory of a computer and executed using a processor on the computer) that is trained to predict a probability that an escalation event will occur, such as by assigning a probability value (e.g., a likelihood result expressed as a percentage likelihood) to a webpage. It will be appreciated that the classifier is not limited to any particular embodiment, merely that it be able to provide a likelihood of escalation result for a particular page of interest.

Figure 4:
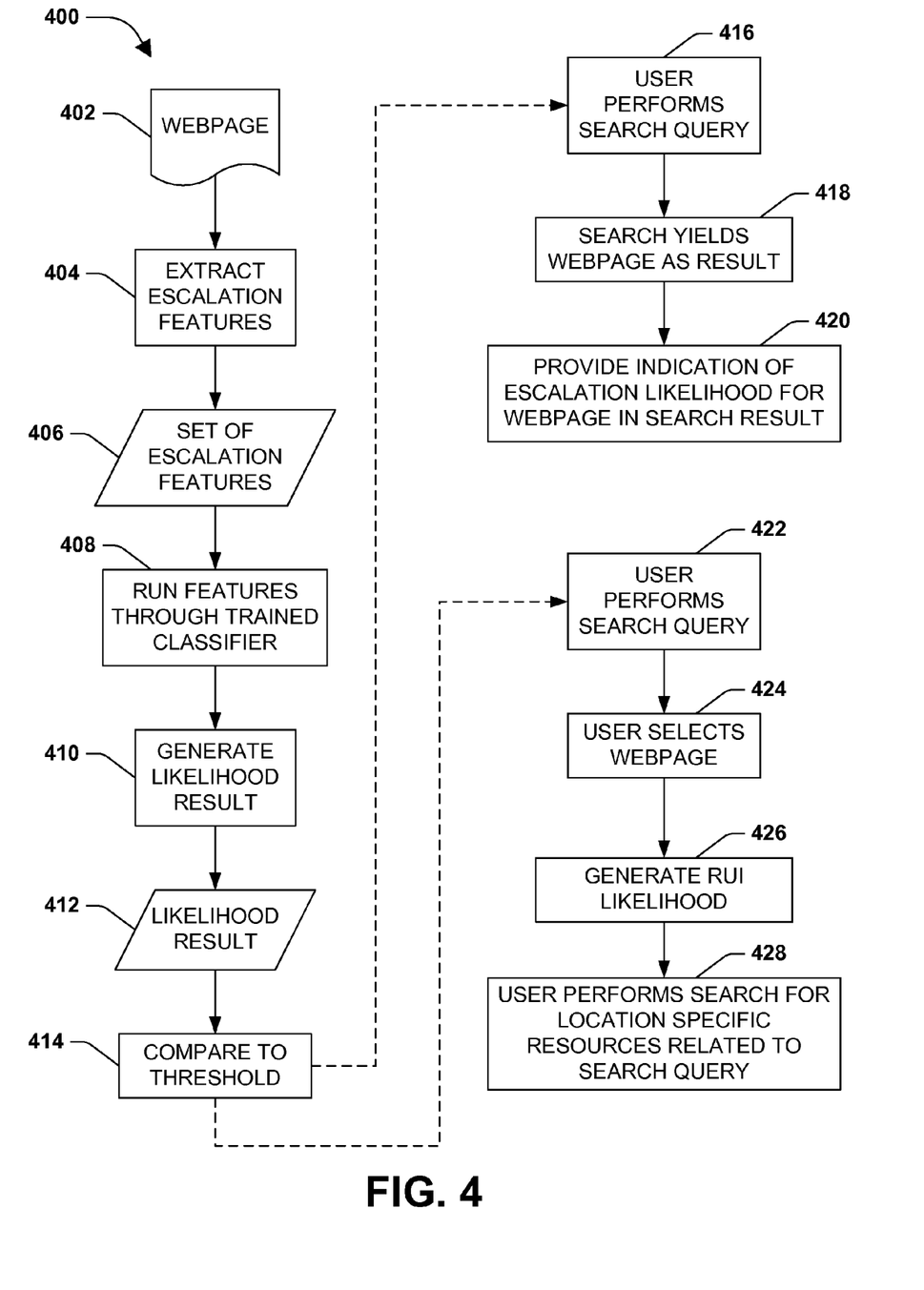
FIG. 4 is a flow diagram illustrating an exemplary embodiment of one or more portions of a method where an escalation likelihood is determined for a webpage.

FIG. 4 is a flow diagram illustrating an exemplary embodiment 400 of one or more portions of a method where an escalation likelihood is determined for a webpage. At 404, escalation features are extracted from a webpage 402. As described above, escalation features can comprise webpage features, user session features, and/or user session history features. A set of escalation features 406 for the webpage is generated. As an example, when a user performs a search query (e.g., 202A or 202B of FIG. 2A) a plurality of query results can be returned (e.g., from a search engine query, toolbar query, etc.), which can comprise webpages. In this example, escalation features sets (e.g., 406) can be extracted from the plurality of webpages returned as results.

At 408, the set of escalation features 406 is run through the trained classifier (e.g., 354 from FIG. 3). The trained classifier generates an escalation likelihood result 412 for the webpage, at 410, which can comprise, for example, a probability that when the webpage is visited by a user, a subsequent search query or webpage selection will comprise an escalation event.

For example, an escalation likelihood result may be 0.7, which can mean that there is a seventy percent probability that the escalation event will occur if the webpage is visited by the user. In this example, the 0.7 score may be a result of the page comprising severe cause to relatively benign symptoms, being unverified, having a lot of advertisements, user proclivity for escalation, or a combination of these things and others. As another example, the escalation likelihood result may be 0.1, which represents a low likelihood of escalation. Here, the score is a result of features on the page that represent a low likelihood of escalation, and/or a user's likelihood of non-escalation based on their history and/or other user histories for similar pages. The escalation likelihood result is not limited to any particular embodiment, merely that it express a likelihood (e.g., probability) that an escalation event occurs.

At 414, the escalation likelihood result 412 is compared to a threshold. In this embodiment, the escalation likelihood result can be compared with a desired escalation threshold to predict if the webpage will comprise an escalation when compared to a previous search query or previous webpage selection. For example, users may prefer a type of yes or no indication of escalation likelihood, where those pages that a likely to result in an escalation event are flagged as such, instead of a probability score. For example, when a user's search query results are returned, the respective webpages in the results can be flagged if their escalation likelihood results meet a desired threshold.

In one embodiment, a desired threshold can be scaled by the user, and/or a default threshold may be provided. Further, in another embodiment, the threshold can be developed by empirical evidence, such as ongoing experimentation, and/or based on the user's actual behavior. For example, a particular user's web-based querying behavior may change over time, and the desired threshold can be scaled up or down based on empirical evidence of searching and escalation events. Further, webpage developer's tactics may change overtime, and features that contribute particular weight to an escalation event may evolve, such as where they no longer contribute to an escalation event as much.

In one embodiment, at 416, the user can perform a search query, and webpages can be returned, at 418. In this embodiment, as described above, an indication of a likelihood of escalation can be provided for the webpage in the search result, at 420. For example, a list of webpages can be returned for a search query comprising "headache causes." In this embodiment, for example, along with a list of the respective webpages returned by the search, an indication of escalation likelihood (e.g., a flag indicating likely escalation, a scale from one to ten, a color scale, or an actual score of likelihood, such as percentage probability) can be provided in the search result (e.g., in the results list, in a toolbar, in a browser, on a user's desktop, etc.). In this way, in this example, the user can identify escalation likelihood for the pages and make an appropriate decision. Further, in another embodiment, a ranking of the pages can be adjusted based on an escalation likelihood result.

In another embodiment, at 422, the user performs the search query, and selects a webpage returned as one of the results, at 424. At 426, a resource likelihood intent (RUI) score can be generated based on the user's selection of the webpage. In this embodiment, a RUI likelihood result can be generated from running the trained classifier. Here, the RUI likelihood result comprises an estimation that a subsequent search query will comprise a resource identification query, where the resources identified comprise services or goods related to a previous search query.

That is, for example, a user's first query may comprise "camping." In this example, the user may select a website, from the returned results, that discusses the types of gear one takes when they go camping, including descriptions and forums. In this embodiment, an RUI result can be generated for the website, which can be used to determine a likelihood that the user's next search will comprise and escalation event where the escalation comprises looking for a specific good or service. As an example, the user's subsequent search query, after visiting the camping site, may be "tent retailers," where the user is looking to compare or even buy a tent for camping.

In this embodiment, this type of escalation event comprises a user specifically looking for a particular good or service. In another embodiment, the resources identified can comprise a location specific service or good related to a previous search query. For example, where the user's first search was for "headache causes," and they selected a site that describes potential causes, an RUI score can be generated for the webpage. In this example, the user's second (subsequent) search query may comprise "neurologists in <zipcode>," where the user is looking to identify a local doctor. In this way, for example, a location specific search query prediction may be utilized to provide mapping locations. That is, an RUI result can be mapped to real-world events, such as making a call, making doctor's appointment, making (or links to making) a purchase, etc.

Figure 5:
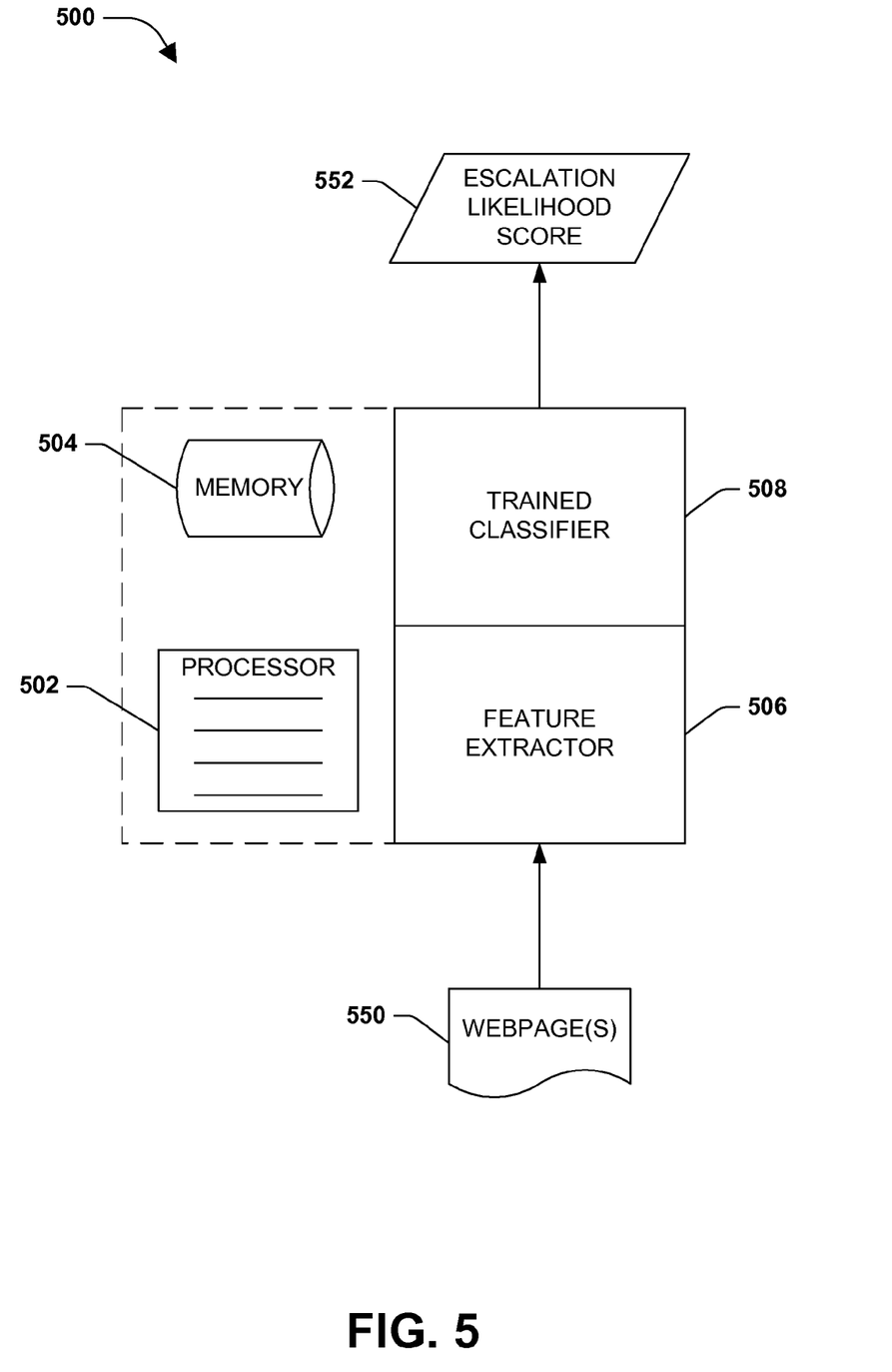
FIG. 5 is a component diagram of an exemplary system configured to predict query escalations for web-based searching.

A system may be devised that provides for identification of escalation events in web-based searching, for example. FIG. 5 is a component diagram of an exemplary system 500 for predicting query escalations for web-based searching. A computer-based processor 502 is configured to execute instructions for system components, and a memory component 504 is configured to store data for the system. It will be appreciated that the processor and memory components can be disposed on a same computing device as other system components, or on disparate computing devices operably linked with other system components.

A feature extraction component 506 is operably coupled with the processor 502, and is used to extract escalation features from webpages 550. In one embodiment, escalation features can comprise one or more of a webpage's: structural features; title features; URL features; first-person testimonials; page reliability features; commercial intent features; and general page features. Further, in another embodiment, the escalation features can comprise escalation features from a user session, and/or escalation features from a user session history. In this embodiment, the features from a user session and/or user session history are not limited to merely a same user, and/or session history. For example, a combination of information from a current user and other user's sessions and/or histories may be used.

A trained classification component 508 is operably coupled with the memory component 504 to generate an escalation likelihood score 552 for a webpage 550 from which one or more escalation features have been extracted. In one embodiment, the escalation likelihood score can comprise an estimation that a subsequent search query will comprise an escalation when compared to a previous search query. In another embodiment, the escalation likelihood score can comprise an estimation that a subsequent webpage selection will comprise an escalation when compared to a previous webpage selection.

Figure 6:
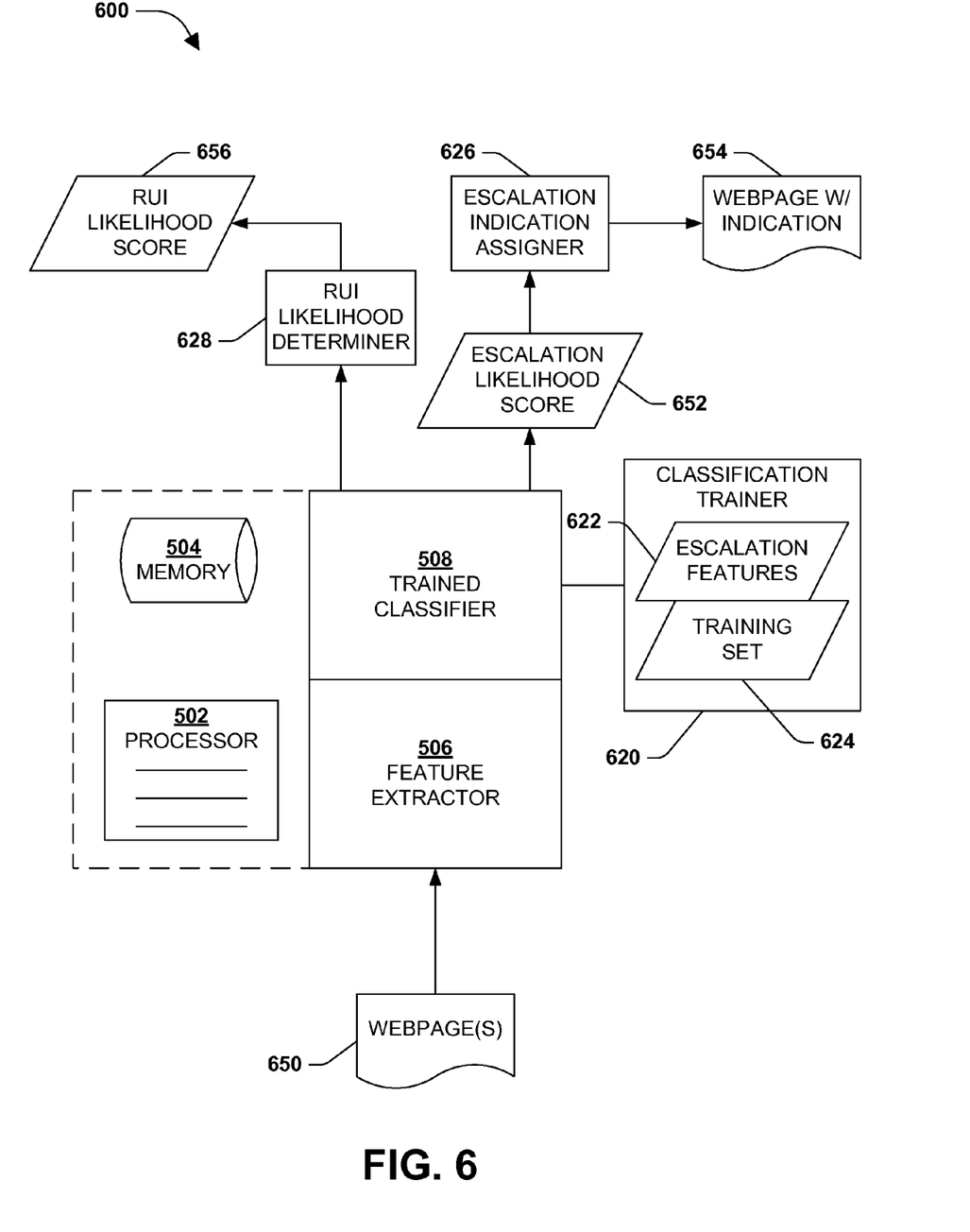
FIG. 6 is a component diagram illustrating an example embodiment where one or more portions of one or more of the systems described herein may be implemented.

FIG. 6 is a component diagram illustrating an example embodiment 600 where one or more portions of the systems described herein may be implemented. A classification component trainer 620 comprises a training set 624. The training set 624 can comprise webpages tagged as resulting in subsequent search query escalations, and webpages tagged as resulting in subsequent search query non-escalations. Further, the classification component trainer 620 comprises one or more sets of escalation features 622 of a webpage.

In this embodiment, the classification component trainer 620 can be configured to train a classification component to generate a query escalation likelihood score 652 for a webpage 650 by running the classification component over the training set 624 using the one or more sets of escalation features 622. In this way, for example, the classification trainer 620 can create a trained classification component 508, used to generate escalation likelihood scores 652.

An escalation indication assignment component 626 is configured to assign an escalation index to a webpage 654 based on the query escalation likelihood score 626 for the webpage 650. Further, the escalation indication assignment component 626 is configured to provide an indication of potential query escalation to a webpage 654 that appears in a search query result using the escalation index. For example, an escalation likelihood score 652 can be generated for a webpage 650, and the escalation indication assignment component 626 can create an index, such as a percent probability, for the webpage 650, and the index can be presented with the webpage in a list of pages returned by a search (e.g., as a scale).

A resource utilization intent (RUI) likelihood component 628 is operably coupled with the trained classification component 508 to generate a RUI likelihood score 656 by running the trained classifier. In this embodiment, the RUI likelihood score comprises an estimation that a subsequent search query comprises a resource identification query, where the resources identified comprise services or goods related to a previous search query. For example, the RUI likelihood component 628 generates a RUI score for the webpage, which indicates (e.g., to a search engine provider) a likelihood that the user is going to specifically search for particular goods or services, such as in their local area.

Figure 7:
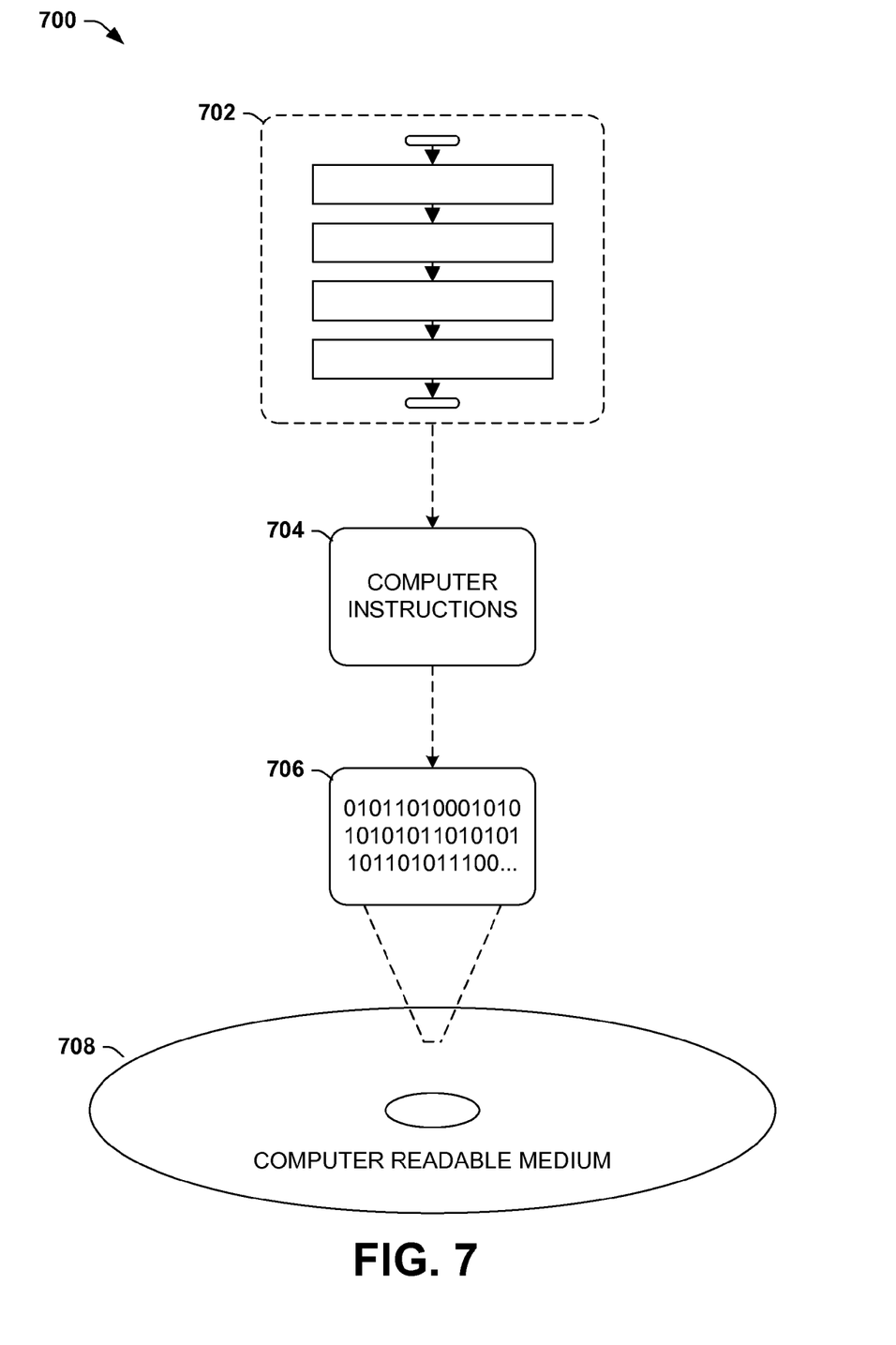
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 100 of FIG. 1, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
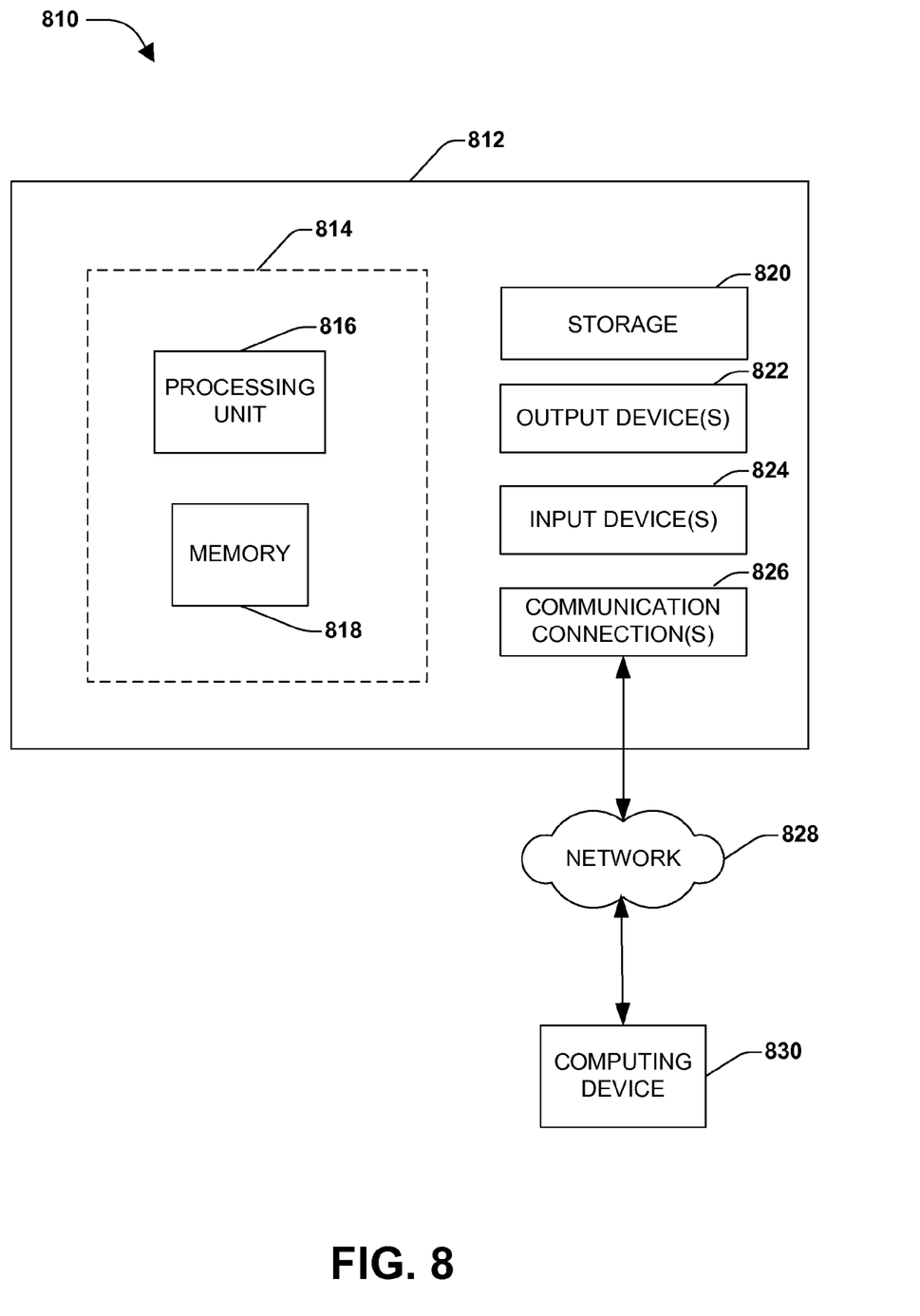
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection (s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device (s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for predicting escalations, comprising:
    extracting an escalation feature from a webpage;
    running the escalation feature through a classifier;
    generating an escalation likelihood result from running the escalation feature through the classifier, the escalation likelihood result comprising at least one of:
        an estimation that a subsequent search query will comprise an escalation when compared to a previous search query; or
        an estimation that a subsequent webpage selection will comprise an escalation when compared to a previous webpage selection; and
    generating a resource utilization intent (RUI) likelihood result from running the escalation feature through the classifier, the RUI likelihood result comprising an estimation that a second subsequent search query will comprise a resource identification query, where a resource identified by the resource identification query comprises at least one of a service or a good related to a prior search query.

2. The method of claim 1, comprising training the classifier to estimate a likelihood of escalation.

3. The method of claim 1, the subsequent search query different than the second subsequent search query.

4. The method of claim 1, the subsequent search query the same as the second subsequent search query.

5. The method of claim 1, extracting an escalation feature from a webpage comprising extracting one or more of:
    a structural feature;
    a title feature;
    a URL feature;
    a first-person testimonial;
    a page reliability feature;
    a commercial intent feature; or
    a general page feature.

6. The method of claim 1, comprising extracting a second escalation feature from a user session and running the second escalation feature through the classifier to generate at least one of a second escalation likelihood result or a second RUI likelihood result.

7. The method of claim 6, extracting a second escalation feature from a user session comprising extracting one or more of:
    a number of queries;
    a query structural feature;
    an escalating result feature;
    a number of non-query webpages; or
    a user session time feature.

8. The method of claim 1, comprising extracting a second escalation feature from a user session history and running the second escalation feature through the classifier to generate at least one of a second escalation likelihood result or a second RUI likelihood result.

9. The method of claim 8, extracting a second escalation feature from a user session history comprising extracting one or more of:
    features of a number of content queries per a time vector;
    features of a prior session query; or
    features of prior session resources.

10. The method of claim 1, the escalation likelihood result comprising an estimation that a subsequent domain specific-related search query for a specific domain will comprise a domain specific query escalation for the specific domain when compared to a previous domain specific-related search query for the specific domain.

11. The method of claim 10, the specific domain being related to medical issues.

12. The method of claim 1, extracting an escalation feature from a webpage comprising extracting a structural feature comprising a distance between a first portion of the webpage and a second portion of the webpage.

13. The method of claim 1, the good comprising a location specific good.

14. A system for predicting escalations, comprising:
    a feature extraction component configured to extract an escalation feature from a webpage;
    a classification component configured to
        run the escalation feature through a classifier; and
        generate an escalation likelihood result from running the escalation feature through the classifier, the escalation likelihood result comprising at least one of:
            an estimation that a subsequent search query will comprise an escalation when compared to a previous search query; or
            an estimation that a subsequent webpage selection will comprise an escalation when compared to a previous webpage selection;
    a component configured to generate a resource utilization intent (RUI) likelihood result from running the escalation feature through the classifier, the RUI likelihood result comprising an estimation that a second subsequent search query will comprise a resource identification query, where a resource identified by the resource identification query comprises at least one of a service or a good related to a prior search query; and
    a processing unit configured to implement at least some of at least one of the feature extraction component, the classification component or the component.

15. The system of claim 14, comprising a classification component trainer configured to train the classification component.

16. The system of claim 14, comprising an escalation indication assignment component configured to:
provide an indication of potential query escalation based upon the escalation likelihood result.

17. The system of claim 14, the escalation feature comprising one or more:
a structural feature;
a title feature;
a URL feature;
a first-person testimonial;
a page reliability feature;
a commercial intent feature; or
a general page feature.

18. The system of claim 14, the feature extraction component configured to extract the escalation feature from one or more of:
a user session; or
a user session history.

19. The system of claim 14, the service comprising a location specific service.

20. A computer readable storage medium, excluding signals, comprising instructions that when executed perform a method for predicting escalations, comprising:

extracting an escalation feature from a webpage;

running the escalation feature through a classifier;

generating an escalation likelihood result from running the escalation feature through the classifier, the escalation likelihood result comprising at least one of:
  an estimation that a subsequent search query will comprise an escalation when compared to a previous search query; or
  an estimation that a subsequent webpage selection will comprise an escalation when compared to a previous webpage selection; and generating a resource utilization intent (RUI) likelihood result from running the escalation feature through the classifier, the RUI likelihood result comprising an estimation that a second subsequent search query will comprise a resource identification query, where a resource identified by the resource identification query comprises at least one of a service or a good related to a prior search query.

* * * * *